Sept. 3, 1946.   L. A. DE ROSA   2,406,813
INTELLIGENCE TRANSMISSION SYSTEM
Filed June 18, 1943   3 Sheets-Sheet 1

INVENTOR.
LOUIS A. DE ROSA
BY
ATTORNEY

Sept. 3, 1946.   L. A. DE ROSA   2,406,813
INTELLIGENCE TRANSMISSION SYSTEM
Filed June 18, 1943   3 Sheets-Sheet 3

INVENTOR.
LOUIS A. DeROSA
BY
ATTORNEY

Patented Sept. 3, 1946

2,406,813

UNITED STATES PATENT OFFICE 2,406,813

INTELLIGENCE TRANSMISSION SYSTEM

Louis A. de Rosa, West Brighton, Staten Island, N. Y., assignor to Federal Telephone and Radio Corporation, Newark, N. J., a corporation of Delaware Application June 18, 1943, Serial No. 491,287

10 Claims. (Cl. 178—30)

This invention relates to improvements in intelligence transmission systems, and more particularly to systems in which intelligence is transmitted in the form of pulses, and received and converted into visual intelligence.

Systems have been heretofore proposed in which intelligence in the form of pulses or a series of pulses is transmitted directly or by carrier wave to a receiver where such pulses are converted into visual intelligence either by means of controlling the pattern on the screen of a cathode ray tube or by impressions upon a moving tape. In some systems the character to be transmitted is divided up into several transverse bands such as five or seven, of several groups of pulses each, the number and position of pulses in each band determining the formation of the transmitted character. The pulses may be sent at a common frequency, or, it is sometimes advantageous to transmit each band of pulses at different frequencies.

In all such systems the time interval between pulses or sets of pulses is determinative of the character to be reproduced at the receiver, and various means have been proposed to produce sets of such timed pulses in accordance with the characteristics of the intelligence to be transmitted, such as a letter or numeral. In prior systems it has been usual to pre-form mechanical patterns which, through the use of light-responsive tubes or similar means form series of pulses corresponding to the letter to be transmitted, the pattern chosen being controlled by a keyboard or similar means. Such systems and such means are described, for example, in the copending applications of Edmond M. Deloraine, S. N. 415,554 filed October 18, 1941 and Edmond M. Deloraine, et al., S. N. 469,056 filed December 15, 1942.

It is one of the objects of the present invention to eliminate the use of mechanical devices previously necessary in producing the timed pulses used as a basis for the formation of character-identifying signals.

Another object of my invention is directed toward the use of an electronic counter circuit for deriving sequentially timed pulses in an intelligence transmission system.

A further object of this invention is to provide an electronic counter circuit for deriving sequentially timed pulses in an intelligence transmission system, together with controllable means for starting and stopping said counter circuit.

These and other features, capabilities and advantages of the invention will appear from the subjoined detail description of one embodiment and a modification thereof, illustrated in the accompanying drawings, in which.

Figure 1:
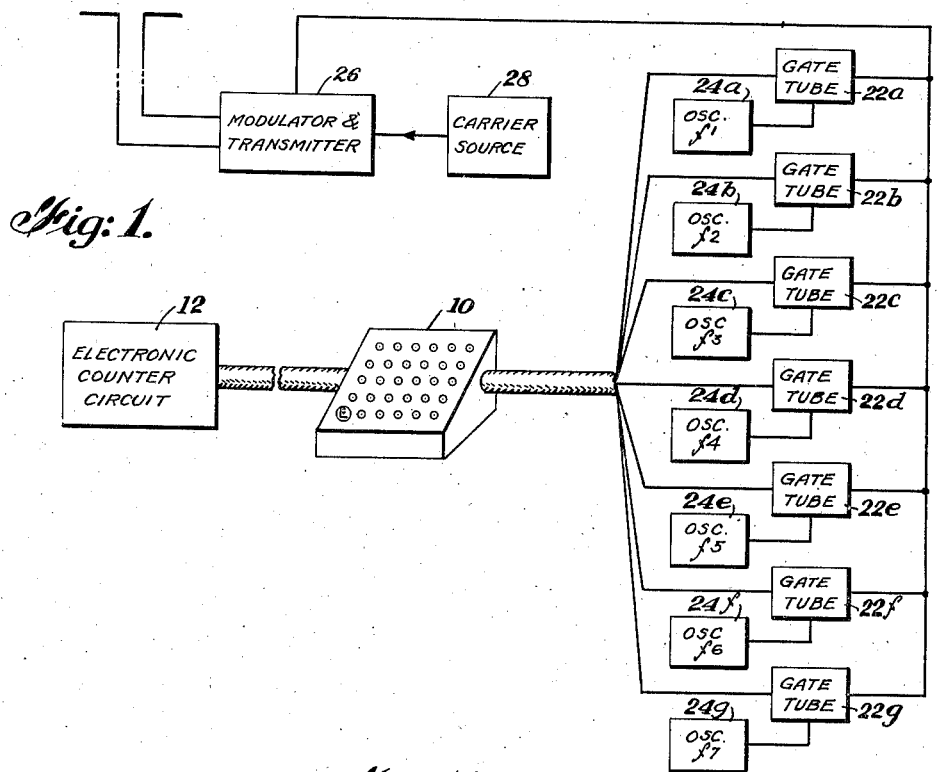
Fig. 1 is a block circuit diagram of a preferred form of signal-transmitting apparatus according to the present invention.

The general arrangement of a preferred form of intelligence determining and transmitting system according to the present invention is illustrated in Fig. 1. Such a system may include a suitable keyboard 10 which itself may be made of well-known construction, the keys of which will have indicia marked thereon corresponding to the character of signal to be transmitted. A sequence of timed pulses will be obtained from the electronic counter circuit 12 and, in accordance with the particular key depressed on the keyboard 10, these pulses will be directed to actuate one of the gate tubes 22a, 22b, 22c, 22d, 22e, 22f and 22g, there being seven of these gate tubes if, for example, the system is a seven band system. Each of the gate tubes is respectively energized by oscillators 24a, 24b, 24c, 24d, 24e, 24f and 24g, operating at different frequencies $f^1$ to $f^7$ respectively. In the preferred form of system illustrated, the gate tubes 22a to 22g inclusive are connected through a common output lead to control the modulation of a transmitter 26 supplied from a carrier source 28. In the case of a wire transmission system, as contrasted to a radio transmission system, the outputs of the gate tubes could be conducted through a transmission line to a receiver in a manner obvious to those skilled in this art.

Figure 2:
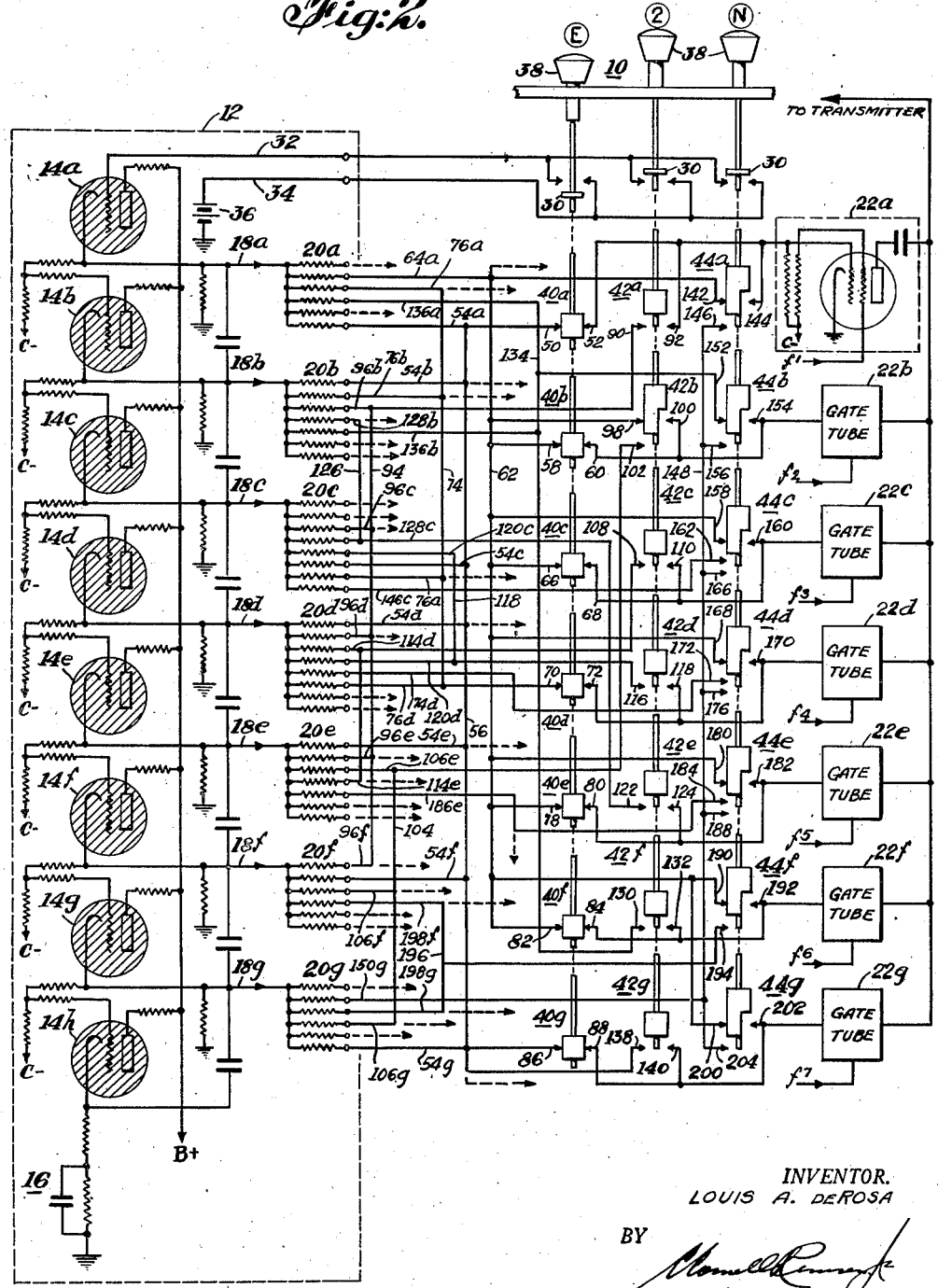
Fig. 2 is a partial detailed circuit diagram of some of the control elements shown in block form in Fig. 1.

In Fig. 2 I have illustrated details of a preferred form of electronic counter circuit, and the manner in which such counter circuit is interconnected with the various gate tubes through switches operated by the keys of keyboard 10. The electronic counter circuit 12 may, for example, comprise seven gaseous discharge tubes 14a to 14g inclusive, so interconnected one with the other, in a manner known to the art that after the first tube 14a is fired it will energize the second tube 14b which, in turn, will extinguish the tube 14a and energize the next tube 14c. A counter circuit of this type is disclosed, for example, in the U. S. patent to Shumard 2,146,862, issued February 14, 1939. Thus, the tubes become conductive and non-conductive sequentially down the line until the last tube 14g is energized. To extinguish the tube 14g, I provide an additional gaseous discharge tube 14h which becomes conductive after the tube 14g and which will then extinguish the latter. The tube 14h will become extinguished automatically after a predetermined period of time through the resistance-capacitance network 16, connected between the cathode of the tube 14h and ground. Output leads 18a to 18g inclusive, are respectively connected to the cathodes of the tubes 14a to 14g inclusive, and as the tubes become sequentially conductive, a pulse will appear on each output lead, the pulse on one output lead being timed with respect to the pulse appearing on the output lead of the prior tube. The electronic counter circuit may be started by providing a short pulse on a grid of the first tube 14a. For this purpose a switch 30 may be provided on each of the keyboard keys 38. When any key is depressed the switch 30 is momentarily closed and, through leads 32 and 34 will momentarily energize the grid of the tube 14a from a source of power 36. Other means for energizing the grid of a gaseous discharge tube and known to the art may, of course be used.

For the purpose of illustrating the formation of character-identifying signals by means of the present invention, I have shown in Fig. 2 three keys which, upon being depressed will transmit pulses of such a character as to form upon the screen of a cathode ray tube the letter "E," the numeral "2" and the letter "N." Each key 38 in addition to the electronic counter circuit starting switch 30, may include a plurality of switching means for interconnecting the outputs of the gaseous discharge tubes 14a to 14g inclusive to the control circuits of the gate tubes 22a to 22g inclusive. For example, if the key corresponding to the letter "E" is depressed the counter circuit 12 is initiated into action by the momentary closure of the switch 30 and at the same time control circuits are established through switches 40a, 40b, 40c, 40d, 40e, 40f and 40g. An example of Fig. 4 (A) shows that in the formation of the letter "E" a continuous pulse, or continuous series of pulses over the entire transmitting band is necessary to form the upper portion of the letter at frequency $f^1$; for frequencies $f^2$ and $f^3$ a pulse need be sent only over the first period; for frequency $f^4$ pulses are sent over the first four periods; at frequencies $f^5$ and $f^6$ pulses are again only sent during the first period, and for frequency $f^7$ pulses are again transmitted during the entire band. Thus, since the gate tube 22a provides a signal at frequency $f^1$ this gate tube must be energized for the entire band. Accordingly, the switch 40a connects the outputs of every one of the gaseous discharge tubes to the grid of the gate tube 22a by completing a circuit between conductors 50 and 52. It will be seen that conductor 50 is connected to conductors 54a, 54b, 54c, 54d, 54e, 54f and 54g through common conductor 56. The conductors 54a to 54g inclusive are respectively connected to the gaseous discharge tube output leads 18a to 18g through suitable isolating resistors or resistors banks 20a to 20g inclusive. Since the gate tube 22b at frequency $f^2$, should operate only during the first period, closure of the switch 40b energizes the grid of gate tube 22b by completing a circuit between conductors 58 and 60, the conductor 58 being interconnected with an isolating resistor in the bank 20a of tube 14a through conductors 62 and 64a. Likewise the switch 40c completes a circuit between conductors 66 and 68, thereby connecting the energized conductor 62 with the grid of gate tube 22c. Since the gate tube 22d is to operate at frequency $f^4$ for periods 1 to 4 inclusive, the switch 40d will complete a circuit between conductors 70 and 72 which interconnect the grid of the gate tube 22d to the outputs of the first four tubes of the counter circuit. It will be noted in this case that the conductor 70 is connected to the common conductor 74 which, in turn, connects to conductors 76a, 76b, 76c and 76d, attached through isolating resistors to the respective output leads 18a, 18b, 18c and 18d. Gate tubes 22a and 22f producing pulsed energy at frequencies $f^5$ and $f^6$ are again required to be energized only during the period of conduction of the first tube of the counter circuit. Thus, the closure of switch 40e interconnects the common conductor 62 of the first gaseous discharge tube through conductors 78 and 80 to the gate tubes of 22e while closure of switch 40f completes a circuit from common conductor 62 through conductors 82 and 84 to the grid of tube 22f. For the letter chosen, the gate tube 22g will operate over the entire band at frequency $f^7$ as did gate tube 22a at frequency $f^1$. Thus, closure of switch 40g completes a circuit from the common conductor 56 through conductors 86 and 88 to the grid of gate tube $f^7$.

Figure 4:
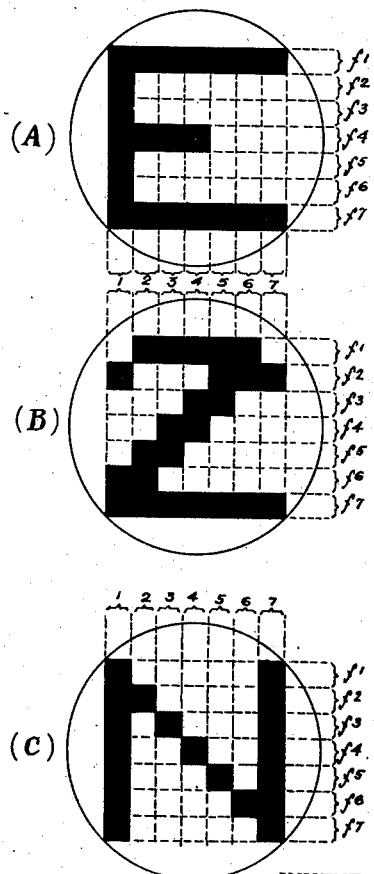
Fig. 4 shows examples of intelligence in the form of letters and numerals of the type which will be reproduced by the system illustrated in Figs. 1, 2 and 3.

Similar switching means are used for other characters in a manner similar to that just described, the manner of arrangement of contacts varying of course, upon the type of letter to be transmitted. In connection with the formation of numeral "2" as illustrated in Fig. 4 (B) the control circuits will differ considerably from those used in making the letter 'E." For example, at frequency $f^1$ the gate tube 22a will be energized for periods 2 to 6 inclusive and the switch 42a will, upon its closure and through conductors 90 and 92 connect the outputs of tubes 18b to 18f inclusive on the grid of this gate tube through conductors 90, 92, common conductor 94 and individual conductors 96b to 96e, these latter conductors being isolated from other conductors going to the same output leads through other resistors of the resistor banks 20b to 20e. In certain instances as for example, for frequency $f^2$ for the numeral "2," the gate tube must be twice energized and de-energized, for example, it must be energized during the first period, and again for the fifth, sixth and seventh periods. To effect such a control of the gate tube 22b, closure of the switch 42b establishes two circuits to the common conductor 100 through the conductors 98 and 102. The conductor 98 can be connected to the common lead 62 which will be the same one as used, for example, for energizing the gate tubes at frequencies $f^2$, $f^3$, $f^5$ and $f^6$ in connection with the formation of the letter "E." The second conductor 102, however, will be attached through common lead 104 to the individual leads 106e, 106f, and 106g to the output leads 18e, 18f, and 18g, respectively, through suitable isolating resistors in resistance banks 20e, 20f, and 20g. Closure of switches 42c, 42d, 42e, 42f, 42g and 42h will effect the closure of proper circuits for the gate tubes 22c to 22g inclusive to form the desired pulses for the remaining frequencies $f^3$ to $f^7$ inclusive. The various circuits may be traced in the manner given above. For example, closure of switch 42c establishes energization of this tube from gaseous discharge tubes 14d and 14e through output leads 18d and 18e, individual conductors 114d and 114e, common conductor 112 and conductors 108 and 110; closure of switch 14d establishes energization of gate tube 22d from gas discharge tubes 14c and 14d through output leads 18c and 18d, individual conductors 120c and 120d, common conductor 118 and conductors 116 and 118. Gate tube 22e will be energized from gaseous discharge tubes 14b and 14c through output leads 18b and 18c, individual conductors 128b and 128c, common conductor 126 and conductors 122 and 124. The energization of gate tube 22f by the gaseous discharge tubes 14a and 14b may be similarly traced from output leads 18a and 18b, individual conductors 136a and 136b, common conductor 134 and conductors 130 and 132. Since the gate tube 22g at frequency $f^7$ is energized over the entire band, closure of the switch 42g may, through conductors 138 and 140 establish a circuit from the common conductor 56 for all of the gaseous discharge tubes to the grid of this gate tube.

The establishing of circuits to form the letter "N" need not be examined in detail but can be traced in the manner set forth above. Upon closure of the various switches 44a to 44g inclusive, taken in connection with conductors 142, 144, 146, 148, 150g, 152, 154, 156, 158, 160, 162, 164c, 166, 168, 170, 172, 174d, 176, 180, 182, 184, 186e, 188, 190, 192, 194, 196, 198f, 198g, 200, 202 and 204. Attention is directed to the fact, however, that in the formation of a character such as the letter "N," it may be necessary to start and stop the gate tube three times as, for example, the gate tube 22c at frequency $f^3$. This merely requires a still further contact on the switch 44c as will be readily apparent from the drawings. Similar switches are used at 44d and 44e.

Figure 3:
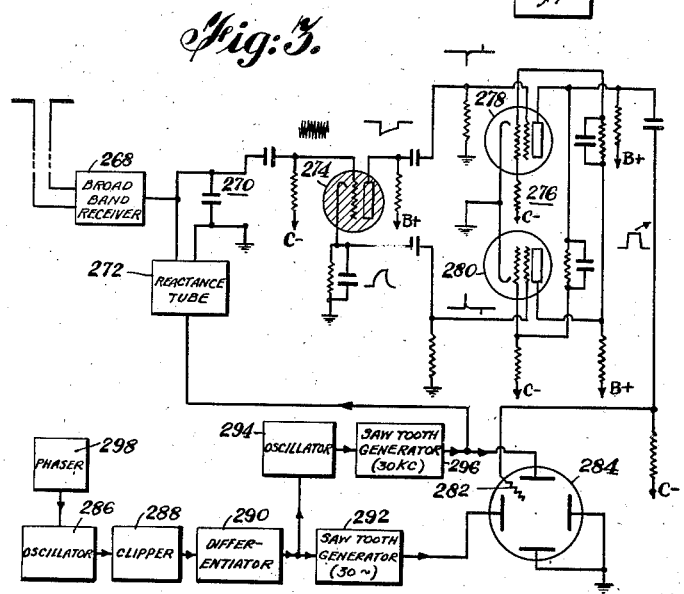
Fig. 3 is a circuit diagram, partially in block form, illustrating an intelligence receiving and converting system adapted to be used with the transmitting system illustrated in Figs. 1 and 2.

Since, in accordance with the manner of transmitting the pulsed character-determining features by means of the circuits illustrated in Figs. 1 and 2, each frequency band may be (depending upon the form of the character) simultaneously energized and simultaneously transmitted if the signals are to be converted into visual intelligence by means of a cathode ray tube, the receiver must be provided with means for controlling the scanning of such a tube for the purpose of separating the signals on the different frequencies. An example of an arrangement for receiving and converting such signals into visual intelligence upon the screen of a cathode ray tube is illustrated in Fig. 3. This system forms no part of the present invention but is covered in the copending application of Edmond M. Deloraine and Louis A. de Rosa, S. N. 489,760 filed June 5, 1943. This receiver includes a suitable broad band receiving apparatus 268 having a tuning circuit 270 tunable over the range of frequency $f^1$–$f^7$ of the transmitter. The output from this tunable circuit 270 controls the grid of a gas filled tube 274 from whose anode and cathode are derived control potentials for a trigger circuit 276 consisting of a pair of pentodes 278, 280. The output of one of the pentodes 278 is connected to the control grid 282 of the cathode ray tube 284. Horizontal travel of the cathode ray beam may be controlled from an oscillator 286 which through a clipper 288, a differentiator 290 and generator 292, supplies a saw-tooth wave of, for example, 30 cycles to the horizontal plates of the cathode ray tube. The differentiator 290 may also key a second oscillator 294 controlling a saw-tooth wave generator 296 of, for example, 30,000 cycles applied to the vertical beam-scanning plates. These two scanning sources will, therefore, combine to move the beam of the cathode ray tube slowly across the face of the screen but rapidly up and down. A phaser 298 may be used to control the oscillator 286 so that the picture of the received character may be properly positioned on the screen of the cathode ray tube. The high frequency generator 296 may also be used to control a reactance tube 272 connected across the tuned circuit 270 for the purpose of scanning this tuned circuit at a frequency corresponding to the frequency of the vertical scanning wave of the cathode ray tube. Thus, when signals on frequency bands $f^1$ to $f^7$ are simultaneously received, the circuit 270 will be sequentially tuned over this frequency band at an extremely rapid rate corresponding to the vertical scanning frequency of the cathode ray tube 284. Through the control tube 274 and the trigger circuit 276, the control grid 282 will only permit a signal on the screen when a signal at the frequency which is being instantaneously scanned is being received. Thus, as the horizontal scanning of the cathode ray tube moves relatively slowly across the screen, the grid 282 will produce on the screen a pattern built up of a series of short partial pulses whose horizontal position is determined by the low frequency generator 30 and whose vertical position is determined by the high frequency generator 296 and which, due to rapid scanning of the tuning circuit 270 will, furthermore, only appear when a signal is at a predetermined frequency and at a time correlated with the position of the vertical scanning wave.

In cases where the signal is not to be reproduced on a cathode ray tube, it may be unnecessary to provide means for scanning the tuning even though all of the frequencies are received simultaneously. This will be true, for example, if the signals are to be reproduced upon a moving tape. In such a case it will be merely necessary to apply the output from a broad band receiver through corresponding filters, amplifiers and rectifiers to individual relays operating pencils or other marking devices. Such a system is more fully disclosed and described in the aforedescribed Deloraine and de Rosa copending application.

Figure 5:
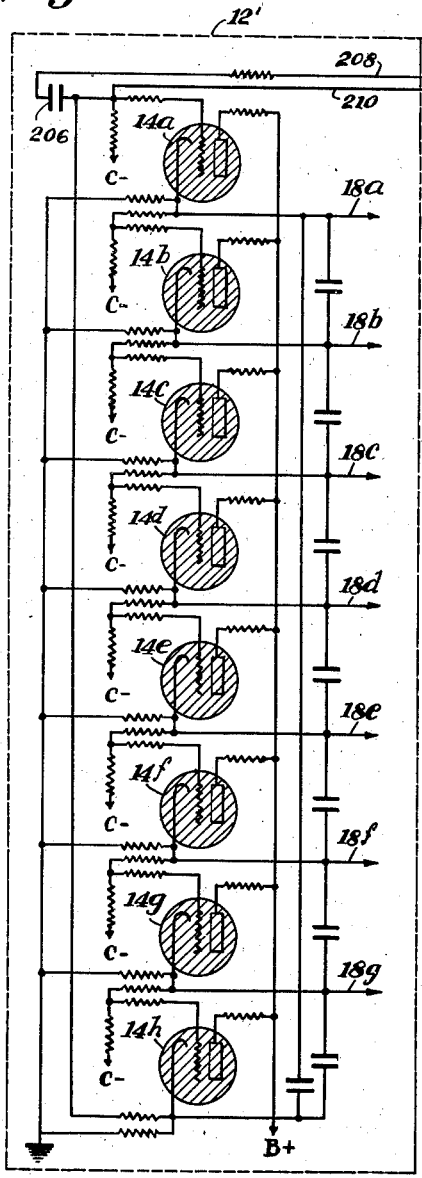
Fig. 5 is a partial detailed circuit diagram of a modified form of signal-transmitting apparatus.
Figure 5:
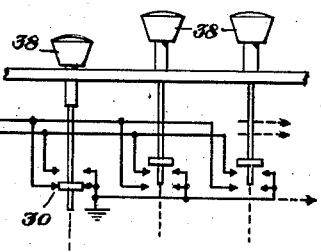

In the counter circuit illustrated in Fig. 2, provision was made for stopping the operation of the circuit automatically, after one series operation. It is possible that a mere single transmission of the signal would be insufficient to produce a proper image on the screen of a cathode ray tube, and for this reason it may be desirable to provide a counter circuit whereby each letter will be repeated several times. A modification of the counter circuit indicated at 12' in Fig. 5 will be satisfactory for this purpose. The counter circuit itself, in this case, is substantially identical with that illustrated in Fig. 2 except that here the last tube 14h is connected back to the first tube 14a in the same manner as each tube is connected to the next succeeding tube so that as a result, when once energized, the circuit will continue to operate unless positive means are provided for stopping it. In order to control the starting and stopping of the counter circuit 12', I have also shown in Fig. 5 modified switches 30' which are opeated when any one of the character-forming keys is depressed. Upon depression of any key, the switches 30' will interconnect the lead 210 attached to the grid resistor for tube 14a to ground. This connection is momentary but is sufficient to reduce the negative bias on the grid of this first tube to start the same operating and thus initiate the entire electronic counter circuit. In the final position of a key 38, the switch 30' closes a second contact which connects the cathode of the last tube 14h and the grid of the first tube 14a to ground through a condenser 206, via conductor 208. The effect of this connection is to permit several rotations of the counter circuit, during which time a potential is gradually built up on the condenser 206 which will finally be sufficient to extinguish the last tube 14h and simultaneously prevent the first tube 14a from firing. The rate at which this potential builds up can be controlled as desired, but will preferably be such as to permit several, (as ten) revolutions of the counter circuit before the same is stopped. Thus, each letter will be repeated several times and a clear picture of the same on the screen of a cathode ray tube in the receiver is assured.

Certain details of construction which will be obvious to those skilled in this art have not been minutely described since they themselves are not considered to form any part of the present invention. For example, the details of the keyboard 10 have not been illustrated. This keyboard may embody the features of usual keyboards known to the art in which, for example, the depression of one key automatically releases a key already depressed so that special releasing means for each key are not necessary. Of course, additional means will be provided for releasing a depressed key without pressing some other character-forming key. While I have illustrated in Figs. 2 and 5, the addition of separate switch means for each key to start or start and stop the respective electronic counter circuits, it will be understood that such a separate switch may be in the form of a separately actuated key, if desired. Furthermore, while I have illustrated as an example of this invention a keyboard in which the keys directly operate switches for interconnecting the output of the electronic counter circuits with the various gate tubes, it will be understood by those skilled in this art that individual keys may actuate relays for accomplishing this indirectly instead of directly. The form of switch mechanism illustrated has only been given by way of example and it is not intended that this invention be limited to any particular type of key-operated switch mechanism.

No means have been illustrated for definitely synchronizing the receiver with the transmitter systems above described. Such synchronization is not necessary in most cases and the mere adjustment of the scanning voltage by a phaser as described to bring the picture of the character to the center of the screen is usually sufficient. However, if positive synchronization is desired, this may be effected by the transmission and reception of an additional synchronizing pulse in the manner known to the art. Such synchronizing pulse might, for example, be derived from the additional tube of the trigger circuit.

While I have shown and described one embodiment of the invention and one modification thereof, it is to be understood that it may be embodied in other forms without departing from the principles thereof. Accordingly, it is to be understood that this description is made only by way of example and not as a limitation on the scope of my invention as set forth in the objects and the accompanying claims.

I claim:

1. In a system for the transmission and reception of intelligence, the combination of an electronic counter circuit including a plurality of sequentially firing gaseous discharge tubes, means deriving a series of sequentially timed pulses from said gaseous discharge tubes, a corresponding plurality of normally non-conductive gate tubes, an actuating circuit for each gate tube, a separate energy source for each gate tube, the frequency of each source being different, transmitting means connected to the outputs of said gate tubes, means for starting and stopping said electronic counter circuit, switching means respectively interconnecting the outputs of said gaseous discharge tubes to the actuating circuits of said gate tubes to apply the sequentially timed pulses thereto in accordance with the intelligence-signifying signals desired, and a receiver, said receiver including means converting the received pulsed signals into intelligence.

2. The combination according to claim 1, in which said switching means comprises a keyboard provided with a plurality of control keys each having indicia thereon corresponding to a character to be transmitted, and switches intermediate the outputs of said gaseous discharge tubes and the actuating circuits of said gate tubes operated, by said keys.

3. The combination according to claim 1, in which said switching means comprises a keyboard provided with a plurality of control keys each having indicia thereon corresponding to a character to be transmitted, and switches intermediate the outputs of said gaseous discharge tubes and the actuating circuits of said gate tubes, operated by said keys, and in which said starting means includes an additional switch actuated by each key, connected to the grid circuit of the first tube, and means controlled by said additional switches for momentarily increasing the grid potential of said first tube.

4. A system for producing intelligence-signifying signals comprising, in combination, an electronic counter circuit including a plurality of sequentially firing gaseous discharge tubes, means deriving a series of sequentially timed pulses from said gaseous discharge tubes, a corresponding plurality of normally non-conductive gate tubes and an actuating circuit for each gate tube, a separate energy source for each gate tube, the frequency of each source being different, transmitting means connected to the outputs of said gate tubes, means for starting and stopping said electronic counter circuit, and switching means respectively interconnecting the outputs of said gaseous discharge tubes to the actuating circuits of said gate tubes to apply the sequentially timed pulses thereto in accordance with the intelligence-signifying signals desired.

5. The combination according to claim 4, in which said switching means comprises a keyboard provided with a plurality of control keys each having indicia thereon corresponding to a character to be transmitted, and switches intermediate the outputs of said gaseous discharge tubes and said gate tubes operated by said keys.

6. The combination according to claim 4, in which said switching means comprises a keyboard provided with a plurality of control keys each having indicia thereon corresponding to a character to be transmitted, and switches intermediate the outputs of said gaseous discharge tubes and said gate tubes operated by said keys, and in which said starting means includes an additional switch actuated by each key, connected to the grid circuit of the first tube, and means controlled by said additional switches for momentarily increasing the grid potential of said first tube.

7. The combination according to claim 4, in which the means for stopping said electronic counter circuit comprises an additional gaseous discharge tube for extinguishing the last tube of said counter circuit, and a condenser-resistor leakage circuit connected to the cathode of said additional tube for extinguishing the same a predetermined time after it has been energized, and in which said starting circuit includes means for temporarily increasing the grid potential on the first tube of the counter circuit.

8. The combination according to claim 4, in which said switching means comprises a keyboard provided with a plurality of control keys each having indicia thereon corresponding to a character to be transmitted, and switches intermediate the outputs of said gaseous discharge tubes and said gate tubes, operated by said keys, in which said starting means includes an additional switch actuated by each key, connected to the grid circuit of the first tube and means controlled by said additional switches for momentarily increasing the grid potential of said first tube, and in which said stopping means comprises an additional gaseous discharge tube for extinguishing the last tube of said counter circuit and a condenser-resistor leakage circuit connected to the cathode of said additional tube for extinguishing same a predetermined time after it has been energized.

9. The combination according to claim 4, in combination with an additional gaseous discharge tube interconnecting the last tube of said electronic counter circuit with the first tube thereof, whereby said counter circuit will operate in a continuously rotating fashion, and wherein said starting and stopping means includes a condenser and a ground, means connecting the grid of the first tube to the ground for reducing the grid bias thereon and render said first tube conductive, and means for connecting the grid of the first tube and cathode of said additional tube to ground through said condenser to build up sufficient potential on said condenser after a number of cycles of operation to extinguish said additional tube without reenergizing the grid of said first tube, whereby said counter circuit will cease to operate.

10. The combination according to claim 4, in combination with an additional gaseous discharge tube interconnecting the last tube of said electronic counter circuit with the first tube thereof, whereby said counter circuit will operate in a continuously rotating fashion, in which said switching means comprises a keyboard provided with a plurality of control keys each having indicia thereon corresponding to a character to be transmitted, and switches intermediate the outputs of said gaseous discharge tubes and said gate tubes, and in which said starting and stopping means includes a condenser, a ground, a negative grid bias on said first tube, an additional switch operated by each key, and conductors interconnecting each of said additional switches to said ground, said condenser, and the grid of said first tube and the cathode of said additional tube, so that when a key is depressed each switch first, momentarily connects the grid of said first tube to ground for removing the grid bias therefrom to start the counter circuit operating, and then in the final depressed position each switch connects the grid of the first tube and the cathode of the additional tube to ground through said condenser to cut off the additional tube without starting the first tube after a number of cycles of operation of the counter circuit.

LOUIS A. DE ROSA.